(12) United States Patent
Akaike et al.

(10) Patent No.: US 9,931,967 B2
(45) Date of Patent: Apr. 3, 2018

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/487,974

(22) Filed: Apr. 14, 2017

(65) Prior Publication Data

US 2017/0313225 A1    Nov. 2, 2017

(30) Foreign Application Priority Data

Apr. 28, 2016 (JP) .................................. 2016-090904

(51) Int. Cl.
  *B60N 2/68* (2006.01)
  *F16B 5/02* (2006.01)
(52) U.S. Cl.
  CPC ............ *B60N 2/682* (2013.01); *F16B 5/0225* (2013.01)
(58) Field of Classification Search
  CPC .............................. B60N 2/682; F16B 5/0225
  USPC .......................................... 297/216.1, 463.2
  See application file for complete search history.

(56) References Cited

U.S. PATENT DOCUMENTS

| | | | |
|---|---|---|---|
| 6,422,526 B1* | 7/2002 | Ishikawa ................ | B60N 2/071 297/216.18 |
| 7,314,249 B2* | 1/2008 | Becker ................... | B60N 2/002 297/468 |
| 7,384,103 B2* | 6/2008 | Rausch ................ | B60N 2/0705 297/468 |
| 2011/0133439 A1* | 6/2011 | Pearce ................... | B60R 22/28 280/805 |

FOREIGN PATENT DOCUMENTS

JP        2005-118327       5/2005

* cited by examiner

*Primary Examiner* — Anthony D Barfield
(74) *Attorney, Agent, or Firm* — Greenblum & Bernstein, P.L.C.

(57) ABSTRACT

A vehicle seat includes: a first member; a second member; an insertion fastening structure configured to apply an axial tension to an opposed surface portion of the first member and an opposed surface portions of the second member so as to be pressed against each other; and an adjustment member. The opposed surface portion of the second member includes different surface shape portions facing respective surfaces toward directions different from an application direction of the axial tension, and the adjustment member plastically deforms the opposed surface portion of the second member such that the opposed surface portion of the second member, including the different surface shape portions, is pressed and sandwiched between the adjustment member and the opposed surface portion of the first member by the application of the axial tension.

9 Claims, 6 Drawing Sheets

VEHICLE SEAT

INCORPORATION BY REFERENCE

The disclosure of Japanese Patent Application No. 2016-090904 filed on Apr. 28, 2016 including the specification, drawings and abstract is incorporated herein by reference in its entirety.

BACKGROUND

1. Technical Field

The present disclosure relates to a vehicle seat. More particularly, the present disclosure relates to a vehicle seat including two members fastened to each other by an insertion fastening structure.

2. Description of Related Art

There has been known a structure of a vehicle seat in which two members are fixed integrally by bolt fastening (Japanese Patent Application Publication No. 2005-118327 (JP 2005-118327 A)). The two members are configured to have shapes making plane contact with each other. A bolt shaft is inserted from one member to the other member in a penetrating manner so as to be engaged threadedly with an internal thread formed in the other member, so that both of the members are fastened to each other so as to make surface contact with each other.

SUMMARY

In the above technique, one member into which the bolt shaft is inserted is made of a pipe material, so the one member should be machined into a shape that makes plane contact with the other member. The present disclosure provides a vehicle seat that allows two members to be fastened to each other in a state where they make surface contact with each other appropriately and reasonably without depending on shapes of the two members fastened to each other by an insertion fastening structure.

A vehicle seat according to an aspect of the present disclosure includes: a first member; a second member; an insertion fastening structure fastened by being inserted from one of the first member and the second member to the other one of them and configured to apply an axial tension to an opposed surface portion of the first member and an opposed surface portion of the second member so as to be pressed against each other; and an adjustment member. The opposed surface portion of the second member includes different surface shape portions facing respective surfaces toward directions different from an application direction of the axial tension, the opposed surface portion being brought into contact with the opposed surface portion of the first member. The adjustment member is provided in an axial tension applied part that receives application of the axial tension by the fastening of the insertion fastening structure, and is configured to plastically deform the opposed surface portion of the second member so as to face toward the application direction of the axial tension such that the opposed surface portion of the second member, including the different surface shape portions, is pressed and sandwiched between the adjustment member and the opposed surface portion of the first member by the application of the axial tension.

According to the above aspect, without depending on the shapes of the opposed surface portions of the two members to be fastened by the insertion fastening structure, the two members can be fastened appropriately and reasonably in a face contact state.

In the above aspect, the adjustment member may be attached to the second member in advance so as to be provided in a state where a movement in a direction perpendicular to the application direction of the axial tension is restricted.

According to the above configuration, it is possible to prevent the position displacement of the adjustment member with respect to the member including the different surface shape portions and to plastically deform the different surface shape portions so as to more appropriately face toward the application direction of the axial tension.

In the above aspect, the adjustment member may be provided in a state where a rotation around the application direction of the axial tension relative to the second member is prevented.

According to the above configuration, it is possible to prevent the position displacement, in the rotational direction, of the adjustment member with respect to the member including the different surface shape portions and to plastically deform the different surface shape portions so as to more appropriately face toward the application direction of the axial tension.

In the above aspect, the different surface shape portions may have a partially bent shape, and the adjustment member may abut with bending starting points of the different surface shape portions due to the application of the axial tension, so as to plastically deform the different surface shape portions to be bent around the bending starting points.

According to the above configuration, it is possible to locally deform the different surface shape portions so as to perform hinge-rotation around the bending starting points, and to plastically deform only the different surface shape portions locally and stably to face toward the application direction of the axial tensile without largely breaking a whole shape of the member.

In the above aspect, the different surface shape portions may have a bent shape overhanging to form a mountain shape in the application direction of the axial tension, and the insertion fastening structure may be inserted into a vertex part of the mountain shape so that the mountain shape is pressed and bent flatly by the adjustment member.

According to the above configuration, it is possible to locally deform the different surface shape portions so as to perform hinge-rotation around respective bending starting points of the mountain shape, and to plastically deform only the different surface shape portions locally and stably to face toward the application direction of the axial tensile without largely breaking a whole shape of the member.

In the above configuration, the opposed surface portion of the second member may have escape holes formed in the vertex part of the mountain shape formed by the different surface shape portions, such that the escape holes relieve deformation of inclined portions to be moved in directions to be drawn to each other along with the mountain shape being pressed and bent flatly, so as to prevent expansion of the deformation.

According to the above configuration, the escape holes absorb a deformation amount of excess to occur between the inclined portions when the different surface shape portions are pressed and bent flatly from the mountain shape, thereby making it possible to plastically deform only the different surface shape portions locally and stably to face toward the application direction of the axial tensile without largely breaking the whole shape of the member.

In the above aspect, the insertion fastening structure may be configured to fasten and fix a bolt to an internal thread, and the internal thread may be provided in a member integrally provided with the adjustment member.

According to the above configuration, when the bolt is threadedly engaged with the internal thread provided integrally with the adjustment member, the adjustment member is fastened in the application direction of the axial tension in an integral state with the bolt. Hereby, it is possible to prevent various position displacements of the adjustment member with respect to the bolt appropriately, thereby making it possible to plastically deform the different surface shape portions so as to more appropriately face toward the application direction of the axial tension.

In the above aspect, the second member may be a hollow frame member having a closed sectional shape, and the adjustment member may be positioned inside the hollow frame member in a tensed manner by an elastic force. Further, the first member may be an anchor plate.

According to the above configuration, even if the member including the different surface shape portions has a closed sectional shape and its inside can be hardly observed, it is possible to set the adjustment member to be positioned with respect to the member easily and appropriately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a perspective view when FIG. 5 is viewed from the front lower side.

DETAILED DESCRIPTION OF EMBODIMENTS

A mode for carrying out the disclosure will be described below with reference to the drawings.

Figure 1:
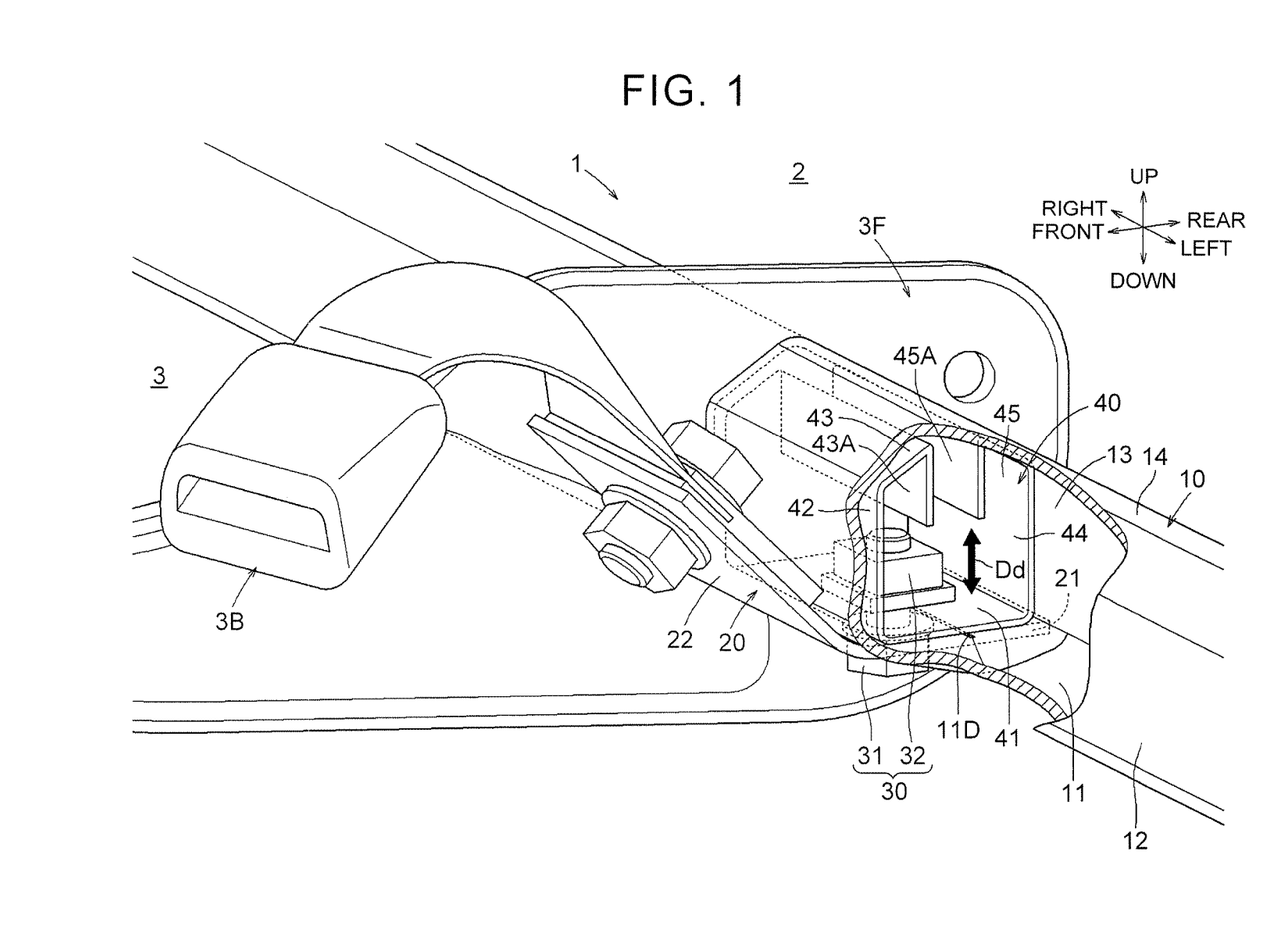
FIG. 1 is an enlarged perspective view illustrating a structure of an essential part of a vehicle seat according to Embodiment 1.

Initially described is a seat 1 of Embodiment 1 with reference to FIGS. 1 to 6. The seat 1 of the present embodiment is configured as a rear seat of an automobile as illustrated in FIG. 1, and is configured as what is called a bench seat where two people can sit right and left. More specifically, the seat 1 has a configuration including a left side seat and a center seat so that two people can sit thereon, and constitutes a seat where three people can sit including a right side seat (not shown). A dimension ratio, in a seat-width direction, between the left side seat, the center seat, and the right side seat (not shown) is 4:2:4. That is, the seat 1 is configured as a wide-side bench seat such that a division ratio between the seat 1 and the right side seat (not shown) is 6:4.

The seat 1 includes a seatback 2 serving as a backrest for a sitting person, and a seat cushion 3 serving as a seat portion. A lower end of the seatback 2 is connected to a rear end of the seat cushion 3 so as to be supported. Further, the seat cushion 3 is connected onto a floor F of a vehicle via a pair of right and left slide rails (not shown). A right rear end of the left side seat of the seat cushion 3, that is, a rear end part on a border side with respect to the center seat, is provided with a buckle 3B to which a tang plate passing through a seat belt webbing (not shown) to be put on a sitting person of the left side seat is attached. The buckle 3B is in such a state where a metal plate-shaped anchor plate 20 serving as a support is fastened by the after-mentioned insertion fastening structure 30 so as to be attached to a base plate portion 11 of a rear pipe frame 10, which is a metal angular pipe forming a rear side framework of the seat cushion 3.

The rear pipe frame 10 is formed into an angular pipe shape extending in an elongated shape in the seat-width direction along a rear edge portion of the seat cushion 3. More specifically, the rear pipe frame 10 is provided in a shape extending in an elongated manner in the seat-width direction such that the rear pipe frame 10 is inserted, in a penetrating manner in the seat-width direction, into a rear end of a middle frame 3F forming a boundary framework between the left side seat and the center seat of the seat cushion 3. Each end portion of the rear pipe frame 10 is integrally connected to another frame member (not shown) forming a framework of another portion of the seat cushion 3.

More specifically, the rear pipe frame 10 is made of an aluminum material formed by extrusion molding into a straight angular pipe shape having a hexagonal section. Further more specifically, as illustrated in FIGS. 1 and 3, the rear pipe frame 10 is formed into a straight angular pipe shape having a hexagonal section, and includes: the base plate portion 11 having a sectional shape bent into a mountain shape toward a lower side; a front plate portion 12 rising upward from a front edge portion of the base plate portion 11; a rear plate portion 13 rising upward from a rear edge portion of the base plate portion 11; and a top plate portion 14 having a sectional shape bent upward in a mountain shape so as to connect respective upper edge portions of the front plate portion 12 and the rear plate portion 13.

Figure 3:
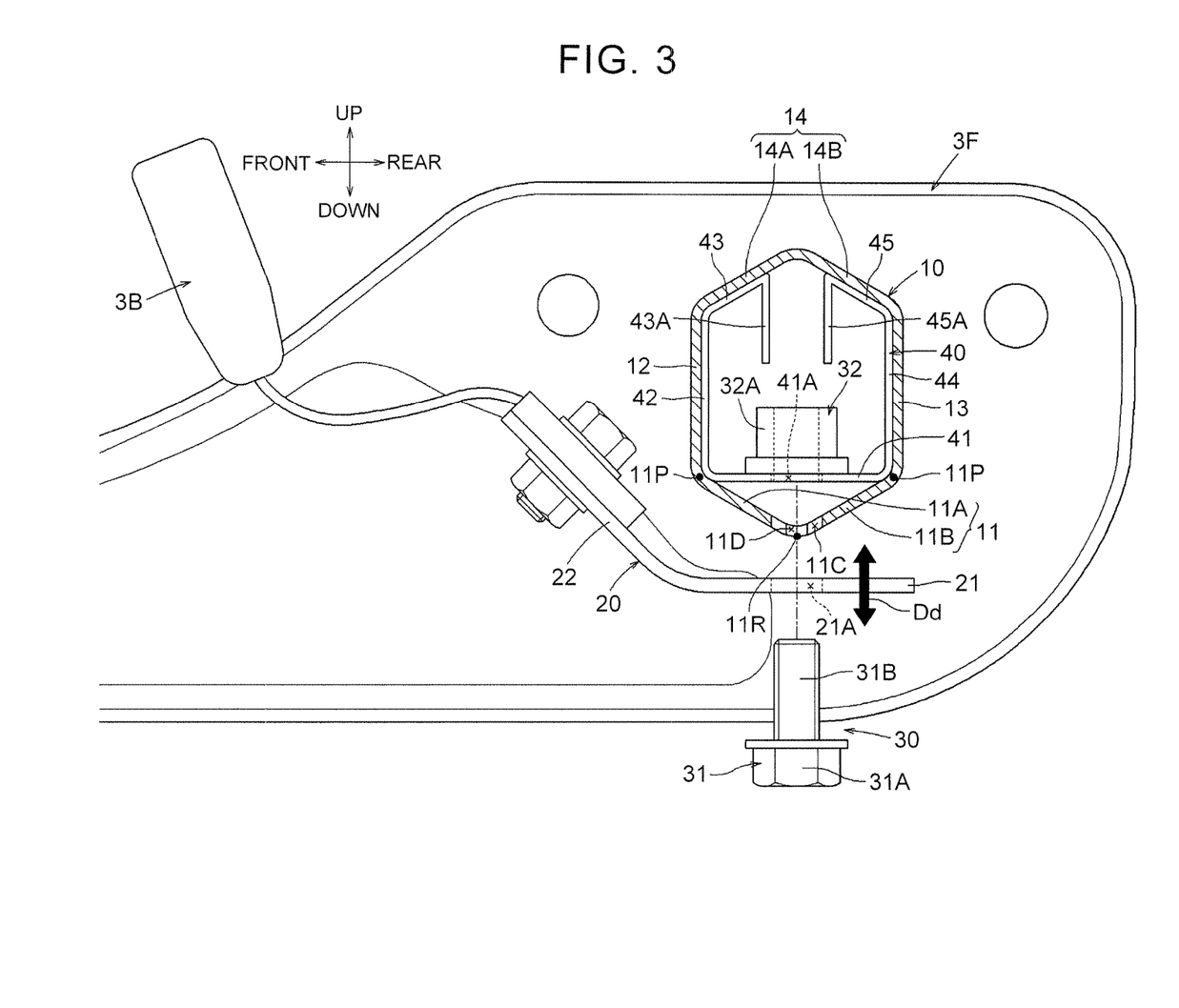
FIG. 3 is a side view thereof.
Figure 4:
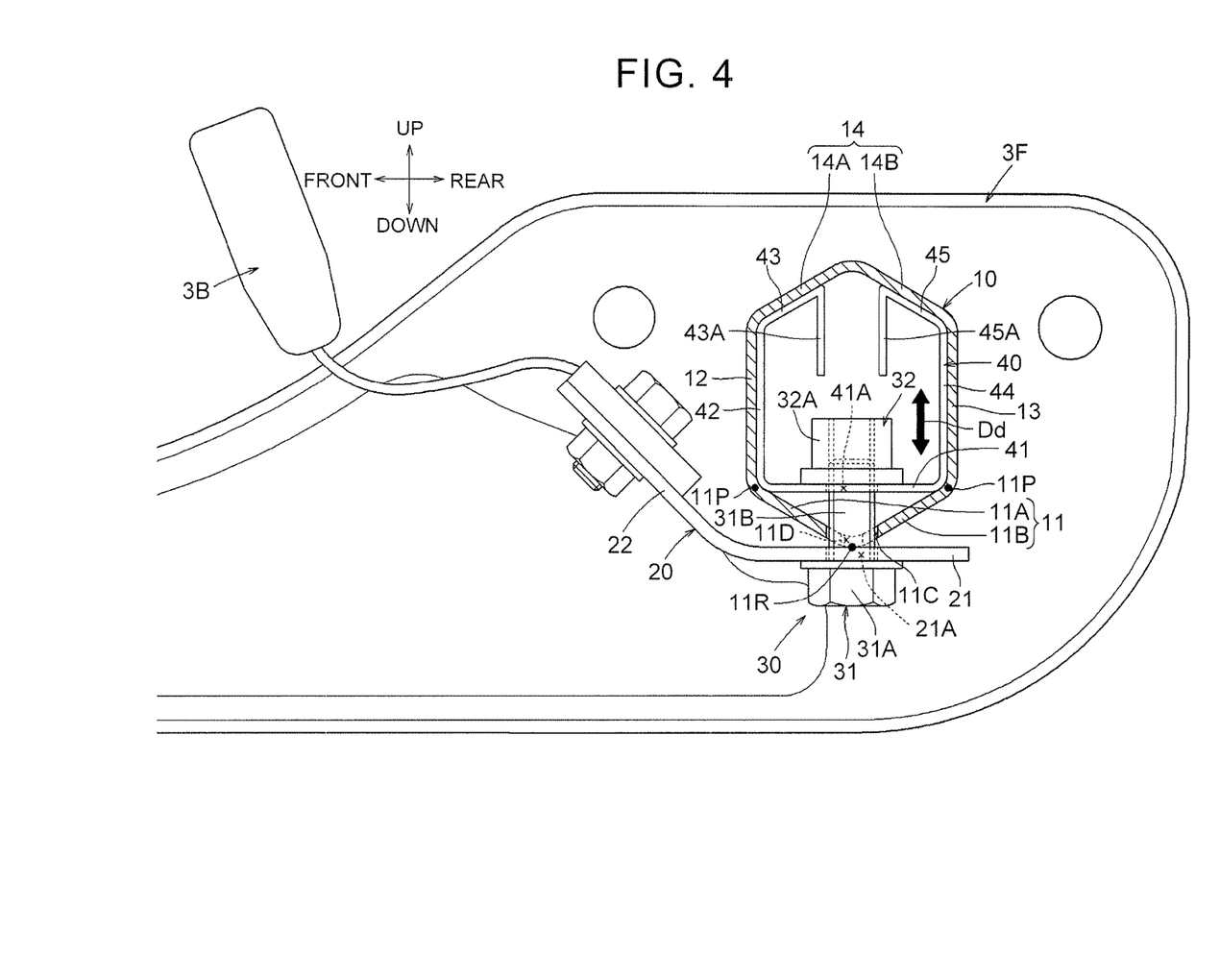
FIG. 4 is a side view illustrating a state where a bolt is inserted from FIG. 3 to a position where the bolt starts to be threadedly engaged with a nut.
Figure 5:
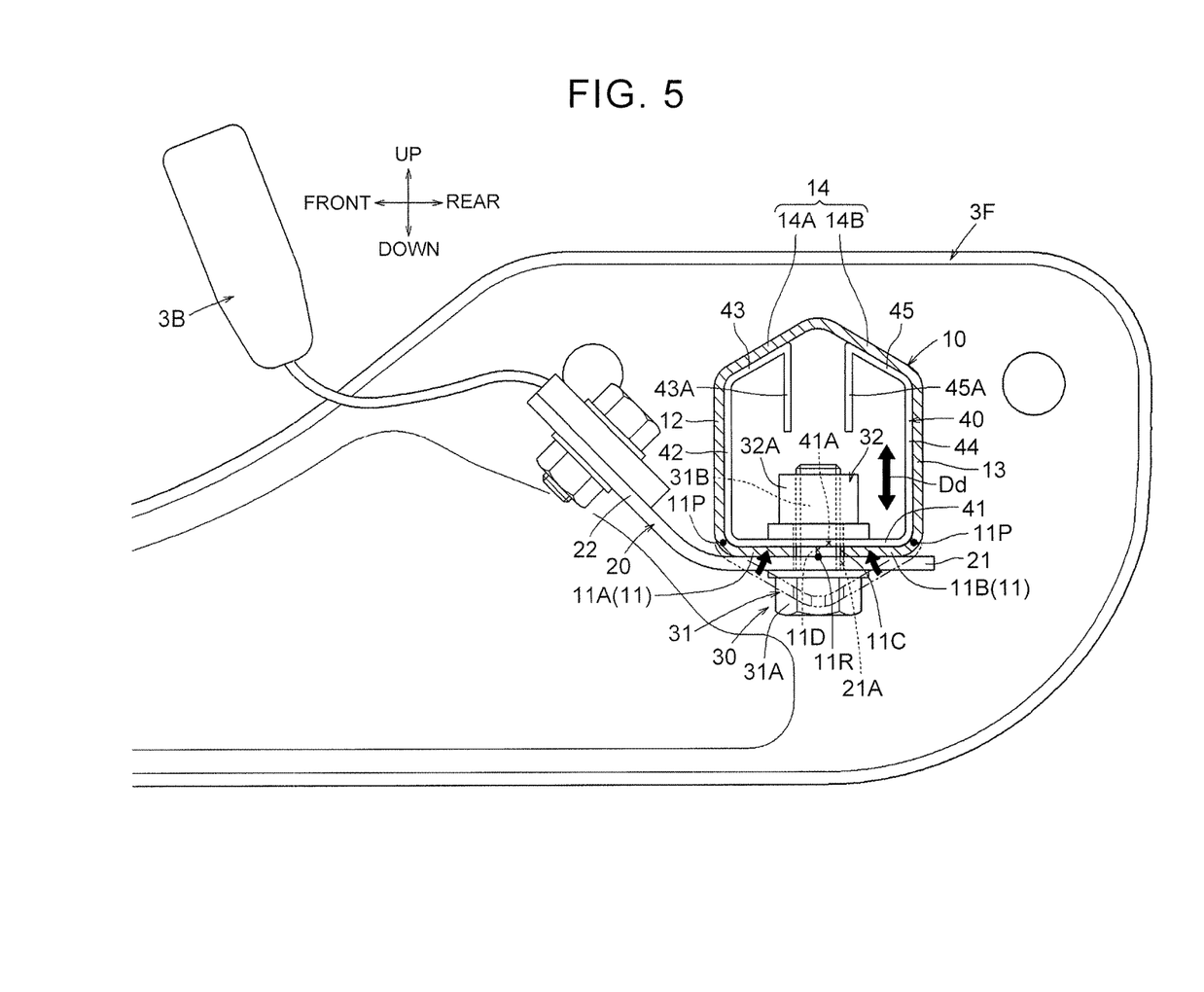
FIG. 5 is a side view illustrating a state where the bolt is fastened and fixed to the nut from FIG. 4.

The anchor plate 20 is integrally assembled to the rear pipe frame 10 configured as described above such that the anchor plate 20 is set so as to abut with the base plate portion 11 of the rear pipe frame 10 from the lower side, and the insertion fastening structure 30 constituted by a combination of a bolt 31 and a nut 32 is inserted therebetween so as to be fastened, as illustrated in FIGS. 3 to 6. More specifically, as illustrated in FIGS. 3 to 4, the bolt 31 is inserted, from the lower side, into the anchor plate 20 set on the base plate portion 11 of the rear pipe frame 10 and the bolt 31 is fastened to the nut 32 set in the rear pipe frame 10. Hereby, as illustrated in FIG. 5, due to application of an axial tension along with the fastening between the bolt 31 and the nut 32, the anchor plate 20 and the base plate portion 11 of the rear pipe frame 10 are strongly pressed and sandwiched against each other in an application direction Dd of the axial tension, so as to be fastened integrally with each other.

At this time, as illustrated in FIGS. 3 to 4, the anchor plate 20 is fastened in such a state where a flat portion 21 formed in a flat face shape abuts, from the lower side, with a vertex part 11R of a mountain shape of the base plate portion 11 forming the mountain shape on a base side of the rear pipe frame 10, so as to be pressed by the insertion fastening structure 30 against the mountain shape of the base plate portion 11. That is, the anchor plate 20 is assembled to the rear pipe frame 10 such that the anchor plate 20 is set to surfaces to which the anchor plate 20 is not opposed in a straight manner inherently. Accordingly, in order to fasten them appropriately, it is preferable that the mountain shape of the base plate portion 11 of the rear pipe frame 10 have a flat plate shape so as to correspond to the flat portion 21 of the anchor plate 20, which has a flat plate shape straightly facing its surface toward the application direction Dd of the axial tension. However, if the base plate portion 11 having the mountain shape is formed into a flat plate shape in advance, a pre-process such as a preliminary press working is required separately.

Figure 2:
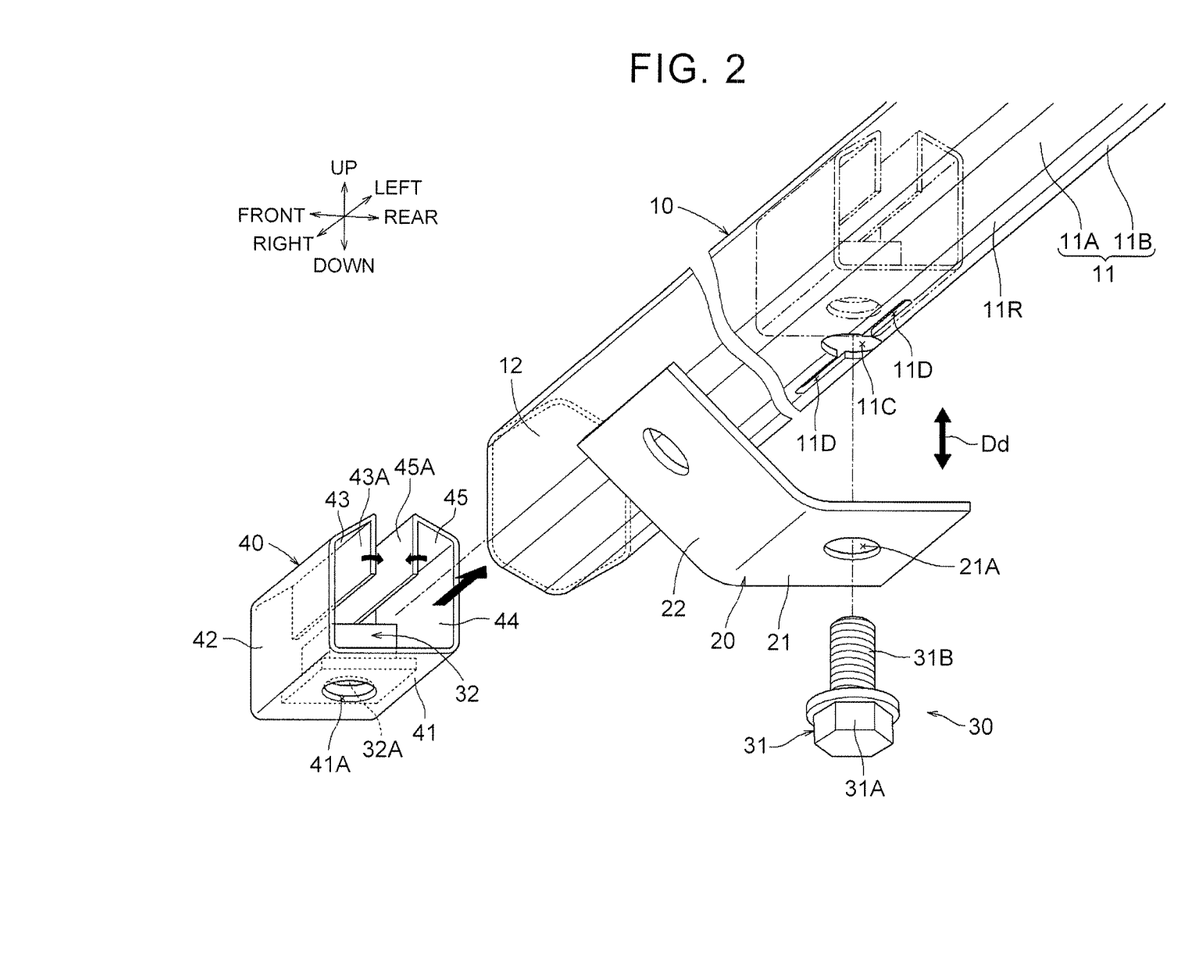
FIG. 2 is an exploded perspective view illustrating a state of the structure before fastening when viewed from a front lower side.

However, the present embodiment does not require such a pre-process, and only by inserting the insertion fastening structure 30 to fasten the base plate portion 11 of the rear pipe frame 10, which has such a mountain shape that faces its surfaces toward directions different from the application direction Dd of the axial tension, the base plate portion 11 can be crushed in a flat plate shape corresponding to the shape of the flat portion 21 of the anchor plate 20 and fastened to the flat portion 21 in a face contact manner, as illustrated in FIG. 5. More specifically, as illustrated in FIGS. 2 to 4, an adjustment member 40 having a bent plate shape and integrally welded to the nut 32 is provided in the rear pipe frame 10. As illustrated in FIGS. 4 to 5, due to application of a fastening force to fasten the bolt 31 to the nut 32, the adjustment member 40 plastically deforms the base plate portion 11 of the rear pipe frame 10 so that the base plate portion 11 is crushed flatly between the adjustment member 40 and the flat portion 21 of the anchor plate 20 so as to make surface contact with the flat portion 21. With such a configuration, the flat portion 21 of the anchor plate 20 and the base plate portion 11 of the rear pipe frame 10 are pressed against each other in the application direction Dd of the axial tension without any gap so as to be firmly and integrally fastened to each other widely in a face contact manner.

An attachment structure of the anchor plate 20 to the rear pipe frame 10 using the insertion fastening structure 30 will be described below further in detail. As illustrated in FIG. 2, the anchor plate 20 is formed by bending one steel sheet material into a shape having a flat portion 21 having a flat plate shape facing toward a seat upper side, and a rising plate portion 22 rising forward and upward from a front edge of the flat portion 21. A through-hole 21A having a round hall shape to pass therethrough a shaft portion 31B of the bolt 31 constituting the insertion fastening structure 30 from the lower side is formed in a central part of the flat portion 21 in a penetrating manner in a plate-thickness direction. Further, the aforementioned buckle 3B is attached to a tip end portion rising from the rising plate portion 22 in FIG. 1.

The insertion fastening structure 30 is constituted by the bolt 31 and the nut 32 made of metal, as illustrated in FIG. 2. The bolt 31 is a so-called hexagon head bolt, and includes a flanged head portion 31A having a seat expanding in a circular plate shape, and a shaft portion 31B extending axially from the flanged head portion 31A and having an external thread on an outer peripheral surface. Further, the nut 32 is a so-called square nut 32 and is configured such that a hole having an internal thread 32A is formed in its central part in a penetrating manner. As illustrated in FIGS. 3 to 4, the nut 32 is provided in a state where the nut 32 is welded onto a flat portion 41 of the adjustment member 40 (described later), and the shaft portion 31B of the bolt 31 is passed through a through-hole 41A formed in the flat portion 41 from the lower side so as to be threadedly engaged with the internal thread 32A.

As illustrated in FIGS. 2 to 3, the adjustment member 40 is constituted by one steel sheet material formed in a bent plate shape opened generally in a pentagonal shape so as to be assembled to be elastically fitted to an inner peripheral surface of the rear pipe frame 10 from an inner side. More specifically, the adjustment member 40 is formed in a bent plate shape opened generally in a pentagonal shape and includes: a flat portion 41 having a flat plate shape facing its surface toward a height direction; a front plate portion 42 rising upward from a front edge portion of the flat portion 41; a front diagonally-upward plate portion 43 rising rearward and upward from an upper edge portion of the front plate portion 42; a rear plate portion 44 rising upward from a rear edge portion of the flat portion 41; and a rear diagonally-upward plate portion 45 rising forward and upward from an upper edge portion of the rear plate portion 44.

As illustrated in FIG. 2, the adjustment member 40 has a shape that is opened between an upper end of the front diagonally-upward plate portion 43 and an upper end of the rear diagonally-upward plate portion 45, and in a state before the adjustment member 40 is assembled inside the rear pipe frame 10, the adjustment member 40 has a shape opened slightly larger than the rear pipe frame 10. The adjustment member 40 is operated so that the opened shape is pressed to be narrowed such that a pair of knob pieces 43A, 45A formed in a shape hanging down from respective upper ends of the front diagonally-upward plate portion 43 and the rear diagonally-upward plate portion 45 are pressed to be narrowed from a state where the knob pieces 43A, 45A are separated from each other.

The adjustment member 40 is inserted into the rear pipe frame 10 in a state where the adjustment member 40 is pressed to be narrowed, and then, its pressed and narrowed state is released, so that the adjustment member 40 is opened due to its restoring force so as to be pressed against the inner peripheral surface of the rear pipe frame 10. Thus, the adjustment member 40 is set in a position-fixed state. More specifically, as illustrated in FIG. 3, the adjustment member 40 is set in a state where the flat portion 41 is crossed over respective bent ends of the mountain shape of the base plate portion 11 of the rear pipe frame 10, the front plate portion 42 and the rear plate portion 44 are set in a state where they are pressed against the front plate portion 12 and the rear plate portion 13 of the rear pipe frame 10 from the inner side in a face contact manner, and the front diagonally-upward plate portion 43 and the rear diagonally-upward plate portion 45 are set in a state where they are pressed against respective inclined portions 14A, 14B of the top plate portion 14 of the rear pipe frame 10 from the inner side in a face contact manner.

Due to the assembling, the adjustment member 40 is set in a state where the adjustment member 40 is pressed against the inner peripheral surface of the rear pipe frame 10 so that its position is not displaced in each of an axial direction, a radial direction, and a circumferential direction. More specifically, the adjustment member 40 is set such that the through-hole 41A formed in the round hall shape in the central part of the flat portion 41 is positioned right above the through-hole 11C formed in the round hall shape in the vertex part 11R of the mountain shape of the base plate portion 11 of the rear pipe frame 10. Due to the assembling, the shaft portion 31B of the bolt 31 inserted through the through-hole 11C formed in the round hall shape in the base plate portion 11 of the rear pipe frame 10 can be threadedly engaged with the internal thread 32A of the nut 32 via the through-hole 41A formed in the adjustment member 40.

Figure 6:
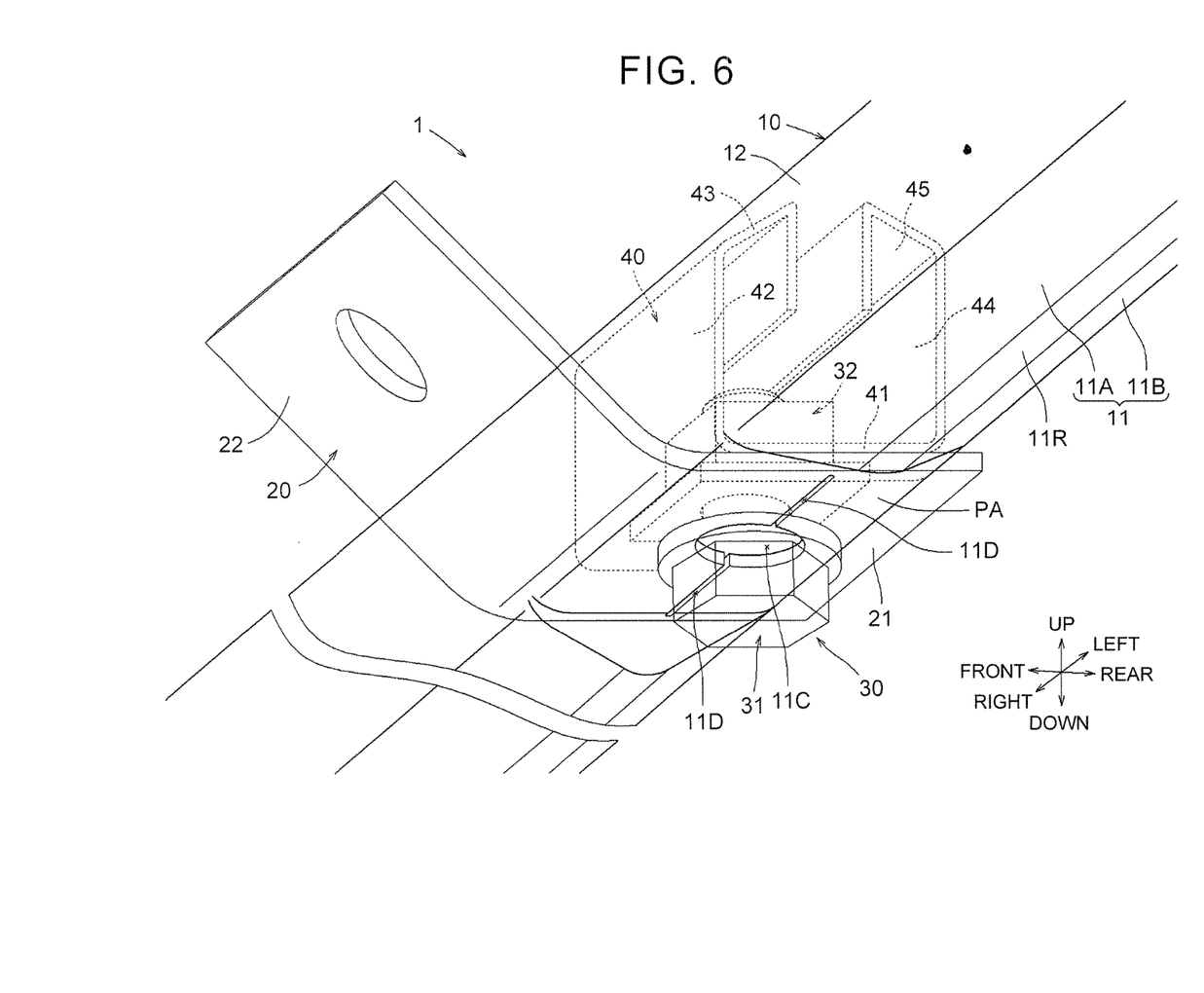

As illustrated in FIG. 2, the through-hole 11C formed in the round hall shape in the vertex part 11R of the mountain shape of the base plate portion 11 of the rear pipe frame 10 has escape holes 11D formed on both sides thereof in the seat-width direction along the vertex part 11R of the mountain shape and extending in a long slit shape in the seat-width direction so as to communicate with the through-hole 11C. As illustrated in FIG. 6, the escape holes 11D function as holes that relieve the deformation of both inclined portions 11A, 11B of the mountain shape to move in directions to be drawn to each other at the time when the mountain shape of the base plate portion 11 of the rear pipe frame 10 is crushed flatly by the fastening of the insertion fastening structure 30. By forming the escape holes 11D, respective deformation moving amounts of the inclined portions 11A, 11B of the mountain shape of the base plate portion 11 to be bent in a flat shape by pressing along with the fastening of the insertion fastening structure 30 are kept within a local region where the flat portion 21 of the anchor plate 20 abuts, without expanding to other regions.

In the above-mentioned procedure, the adjustment member 40 is set by being inserted at a predetermined position in the rear pipe frame 10 as illustrated in FIG. 3. Next will be described a procedure of fastening the anchor plate 20, by the insertion fastening structure 30, to the bottom face portion of the rear pipe frame 10 in which the adjustment member 40 is set. That is, the flat portion 21 of the anchor plate 20 is first set so as to abut with the base plate portion 11 of the rear pipe frame 10 from the lower side, and the shaft portion 31B of the bolt 31 is passed through the through-holes 21A, 11C formed therein from the lower side. Then, the shaft portion 31B of the bolt 31 thus passed is threadedly engaged with the nut 32 via the through-hole 41A formed in the adjustment member 40 (see FIG. 4). Then, the bolt 31 is fastened to the nut 32. Hereby, along with the movement to narrow a distance between the flanged head portion 31A of the bolt 31 and the nut 32 due to the fastening, a distance between the flat portion 21 of the anchor plate 20 and the flat portion 41 of the adjustment member 40 is also narrowed by pressing in the application direction Dd of the axial tension exerted between the flanged head portion 31A and the nut 32, so that the base plate portion 11 of the rear pipe frame 10, bent into the mountain shape at a position sandwiched therebetween, is pressed to be narrowed therebetween so as to be crushed in a flat shape (see FIG. 5).

More specifically, when the fastening proceeds, lower end portions of the inclined portions 11A, 11B of the mountain shape, facing the vertex part 11R, abut with the flat portion 21 of the anchor plate 20, and upper end portions serving as bending starting points 11P of the inclined portions 11A, 11B of the mountain shape abut with the bottom surface of the flat portion 41 of the adjustment member 40, so that the base plate portion 11 of the rear pipe frame 10 deforms by receiving a force of bending by pressing in the application direction Dd of the axial tension therebetween. Due to the bending by pressing, the base plate portion 11 of the rear pipe frame 10 is crushed flatly such that the inclined portions 11A, 11B of the mountain shape thereof move their lower end portions facing the vertex part 11R in the directions to be drawn to each other, around the bending starting points 11P supported from the back side (from the upper side) by the adjustment member 40.

Further, due to progress of the crushing, the base plate portion 11 of the rear pipe frame 10 is crushed in a flat shape facing its surface straight toward the application direction Dd of the axial tension, so as to be pressed and sandwiched without any gap between the flat portion 41 of the adjustment member 40 and the flat portion 21 of the anchor plate 20. As a result, the base plate portion 11 of the rear pipe frame 10 is pressed and sandwiched between the flat portion 21 of the anchor plate 20 and the flat portion 41 of the adjustment member 40 so as to make surface contact therewith straightly in the application direction Dd of the axial tension. Hereby, the base plate portion 11 is fastened by being pressed and sandwiched between the flanged head portion 31A and the nut 32.

As illustrated in FIG. 6, due to the fastening, in the base plate portion 11 of the rear pipe frame 10, only a part thereof against which the flat portion 21 of the anchor plate 20 is pressed is formed as a recessed surface portion PA locally recessed in a flat shape due to the relieving of the deformation by the escape holes 11D.

When the above description is summarized, the seat 1 of the present embodiment has the following configuration. That is, the seat 1 is a vehicle seat (the seat 1) including two members (the rear pipe frame 10 and the anchor plate 20) fastened by an insertion fastening structure (the insertion fastening structure 30). The insertion fastening structure is configured to be inserted from one (the anchor plate 20) of the two members to the other one (the rear pipe frame 10) so as to be fastened thereto, thereby applying an axial tension to opposed surface portions (the flat portion 21 and the base plate portion 11) of the two members so as to be pressed against each other. The two members are configured such that either one (the base plate portion 11) of the opposed surface portions pressed against each other has an original shape including different surface shape portions (the inclined portions 11A, 11B) facing their respective surfaces toward respective directions different from an application direction of the axial tension (the application direction Dd of the axial tension), and is brought into contact with its counterpart opposed surface portion (the flat portion 21). Further, an axial tension applied part (the nut 32) that receives application of the axial tension by the fastening of the insertion fastening structure is provided with an adjustment member (the adjustment member 40) configured to plastically deform the opposed surface portion to face toward the application direction of the axial tension by pressing and sandwiching the opposed surface portion (the base plate portion 11) having the original shape including the different surface shape portions between the adjustment member and the counterpart opposed surface portion due to the application of the axial tension. With such a configuration, without depending on the shapes of the opposed surface portions of the two members to be fastened by the insertion fastening structure, the two members can be fastened appropriately and reasonably in a face contact state.

Further, the adjustment member (the adjustment member 40) is attached in advance to the member (the rear pipe frame 10) including the different surface shape portions (the inclined portions 11A, 11B) out of the two members in such a state where its movement in a direction perpendicular to the application direction of the axial tension (the application direction Dd of the axial tension) is restricted. With such a configuration, it is possible to prevent the position displacement of the adjustment member with respect to the member including the different surface shape portions and to plastically deform the different surface shape portions so as to more appropriately face toward the application direction of the axial tension.

Further, the adjustment member (the adjustment member 40) is configured to be engaged with the member (the rear pipe frame 10) including the different surface shape portions (the inclined portions 11A, 11B), out of the two members, in a state where its rotation around the application direction of the axial tension (the application direction Dd of the axial tension) is prevented (that is, the adjustment member is configured to be fitted in an elastically face contact state). With such a configuration, it is possible to prevent the position displacement, in the rotational direction, of the adjustment member with respect to the member including the different surface shape portions and to plastically deform the different surface shape portions so as to more appropriately face toward the application direction of the axial tension.

Further, the member (the rear pipe frame 10) including the different surface shape portions (the inclined portions 11A, 11B), out of the two members, is configured to include the different surface shape portions as partially bent shapes. The adjustment member (the adjustment member 40) abuts with bending starting points (the bending starting points 11P) of the different surface shape portions due to the application of the axial tension, so as to plastically deform the different surface shape portions to be bent around the bending starting points. With such a configuration, it is possible to locally deform the different surface shape portions so as to perform hinge-rotation around the bending starting points, and to plastically deform only the different surface shape portions toward the application direction of the axial tension (the application direction Dd of the axial tension) locally and stably without largely breaking a whole shape of the member.

Further, the different surface shape portions (the inclined portions 11A, 11B) have bent shapes overhanging to form a mountain shape in the application direction of the axial tension (the application direction Dd of the axial tension), and the insertion fastening structure (the insertion fastening structure 30) is inserted into a vertex part (the vertex part 11R) of the mountain shape, so that the mountain shape is pressed and bent flatly by the adjustment member (the adjustment member 40). With such a configuration, it is possible to locally deform the different surface shape portions so as to perform hinge-rotation around respective bending starting points of the mountain shape (the bending starting points 11P) and to plastically deform only the different surface shape portions locally and stably toward the application direction of the axial tensile without largely breaking the whole shape of the member.

Further, the vertex part (the vertex part 11R) of the mountain shape formed by the different surface shape portions (the inclined portions 11A, 11B) has escape holes (the escape holes 11D) that relieve deformation of inclined portions (the inclined portions 11A, 11B) to be moved in directions to be drawn to each other along with the mountain shape being pressed and bent flatly so as to prevent expansion of the deformation. With such a configuration, a deformation amount of excess to occur between the inclined portions when the different surface shape portions are pressed and bent flatly from the mountain shape is absorbed by the escape holes, thereby making it possible to plastically deform only the different surface shape portions locally and stably so as to face toward the application direction of the axial tensile (the application direction Dd of the axial tension) without largely breaking the whole shape of the member.

Further, the insertion fastening structure (the insertion fastening structure 30) is constituted by a structure to fasten and fix a bolt (the bolt 31) to an internal thread (the internal thread 32A). The internal thread is formed in a member (the nut 32) provided integrally with the adjustment member (the adjustment member 40). With such a configuration, when the bolt is threadedly engaged with the internal thread provided integrally with the adjustment member, the adjustment member is fastened in the application direction of the axial tension (the application direction Dd of the axial tension) in an integral state with the bolt. Hereby, it is possible to prevent various position displacements of the adjustment member with respect to the bolt appropriately, thereby making it possible to plastically deform the different surface shape portions (the inclined portions 11A, 11B) so as to more appropriately face toward the application direction of the axial tension.

Further, the member (the rear pipe frame 10) including the different surface shape portions (the inclined portions 11A, 11B), out of the two members, is configured as a hollow frame member having a closed sectional shape. The adjustment member (the adjustment member 40) is provided in a state where the adjustment member is positioned inside the hollow frame member in a tensed manner by an elastic force. With such a configuration, even if the member including the different surface shape portions has a closed sectional shape and its inside can be hardly observed, it is possible to set the adjustment member to be positioned with respect to the member easily and appropriately.

Other Embodiments

The embodiment of the disclosure has been described above with reference to one example, but the disclosure can be performed in various embodiments other than the above example. For example, the configuration of the vehicle seat of the present disclosure is applicable to seats other than the rear seat of the automobile. Further, the vehicle seat of the present disclosure is widely applicable to seats used in a car other than the automobile, such as a train car, and other vehicles such as an aircraft, a ship, and the like. Further, the configuration of the present disclosure is also applicable to an individual seat for one person, as well as the bench seat for several people. Further, the configuration of the present disclosure is applicable to various seat constituent members such as a seatback, a headrest, an arm rest, an ottoman, and a canopy, as well as the seat cushion in the vehicle seat. Further, the configuration of the present disclosure is applicable to various brackets and reinforcing members, as well as the mainframe forming the main framework along the outer periphery of the seat.

Further, the insertion fastening structure may be constituted by the combination of the bolt and the nut, or may be constituted by a screw and a rivet. Further, the insertion fastening structure may be made of various metal materials, or may be made of various resin materials. Further, as long as the insertion fastening structure is inserted and fastened from one of the two members to the other one, the insertion fastening structure may be configured to be inserted into the other one so as to be fastened in a state where the insertion fastening structure is attached to the one of the two members in an integrated manner.

Further, as long as the two members to be fastened by the insertion fastening structure is configured such that either one of their opposed surface portions pressed against each other has an original shape including different surface shape portions facing their respective surfaces toward respective directions different from the application direction of the axial tension and is brought into contact with its counterpart opposed surface portion, the two members may both have original shapes including different surface shape portions. In a case where the two members both have original shapes including different surface shape portions, both of the two members may be provided with adjustment members. In a case where the above effect can be obtained only either one of the two members, the adjustment member may be provided only in the either one of them. Specific shapes of the different surface shape portions and directions toward which the different surface shape portions face are not limited to any particular shapes and directions, and the different surface shape portions may have various shapes such as a crank shape, a valley-like shape, and a curved shape, and the different surface shape portions may face toward various directions. Further, the member including the opposed surface portion having the original shape including the different surface shape portions may be made of a pipe shape having a polygonal sectional shape, or may be a member having a circular pipe shape, an irregular pipe shape, or other open sectional shapes.

Further, the axial tension applied part that receives the application of the axial tension by the fastening of the insertion fastening structure may be a part constituting the insertion fastening structure, such as the bolt or the nut, or may be a part indirectly receiving the application of the axial tension from the insertion fastening structure, such as constituents of the two members. Further, as long as the adjustment member provided in the axial tension applied part is configured to press and sandwich the opposed surface portion having the original shape including the different surface shape portions between the adjustment member and the counterpart opposed surface portion due to the application of the axial tension so as to plastically deform the opposed surface portion to face toward the application direction of the axial tension, its specific shape and structure are not limited in particular, and various shapes and structures may be employed. The adjustment member may be provided in a shape that applies a force to the opposed surface portion having the original shape including the different surface shape portions from a position farther from an application face to which an axial tension exerted by the insertion fastening structure is applied.

Further, the adjustment member may not necessarily be provided in a state where a movement in the direction perpendicular to the application direction of the axial tension or a rotation around the application direction of the axial tension is restricted relative to the axial tension applied part. That is, as long as the adjustment member may be provided such that, along with the fastening of the insertion fastening structure, the adjustment member exerts a force to plastically deform the opposed surface portion having the original shape including the different surface shape portions with the opposed surface portion being pressed sandwiched between the adjustment member and the counterpart opposed surface portion so that the opposed surface portion faces toward the application direction of the axial tension, the movement in such directions may not necessarily be restricted. Further, the adjustment member may be provided in a state where the adjustment member is guided so as to be movable, relative to the member where the adjustment member is provided, only in the application direction of the axial tension by the application of the axial tension to be received from the insertion fastening structure. Further, the adjustment member may be fixed to the member where the adjustment member is provided, by use of fixing means such as a screw, welding, or press-fitting, as well as elastic fitting. The assembling of the adjustment member to the member where the adjustment member is provided may be performed such that a protrusion for positioning is provided in either one of them so that they can be positioned to each other.

Further, as a modification of the configuration shown in the above embodiment, an anchor plate may be inserted into a hollow internal part of a rear pipe frame so as penetrate and extend through a front plate portion of the rear pipe frame toward the front side from the hollow internal part. Even in such a case, the layout of the adjustment member exemplified in the above embodiment may be replaced with the anchor plate, so that a sectional shape of the rear pipe frame, bent into a mountain shape, can be crushed flatly and fastened along with fastening of the insertion fastening structure.

What is claimed is:

1. A vehicle seat comprising:
   a first member;
   a second member;
   an insertion fastening structure fastened by being inserted from one of the first member and the second member to the other one of them and configured to apply an axial tension to an opposed surface portion of the first member and an opposed surface portion of the second member so as to be pressed against each other; and
   an adjustment member, wherein:
   the opposed surface portion of the second member includes different surface shape portions facing respective surfaces toward directions different from an application direction of the axial tension, the opposed surface portion being brought into contact with the opposed surface portion of the first member; and
   the adjustment member is provided in an axial tension applied part that receives application of the axial tension by the fastening of the insertion fastening structure, and is configured to plastically deform the opposed surface portion of the second member so as to face toward the application direction of the axial tension such that the opposed surface portion of the second member, including the different surface shape portions, is pressed and sandwiched between the adjustment member and the opposed surface portion of the first member by the application of the axial tension.

2. The vehicle seat according to claim 1, wherein
   the adjustment member is attached to the second member in advance so as to be provided in a state where a movement in a direction perpendicular to the application direction of the axial tension is restricted.

3. The vehicle seat according to claim 1, wherein
   the adjustment member is provided in a state where a rotation around the application direction of the axial tension relative to the second member is prevented.

4. The vehicle seat according to claim 1, wherein
   the different surface shape portions have a partially bent shape; and
   the adjustment member abuts with bending starting points of the different surface shape portions due to the application of the axial tension, so as to plastically deform the different surface shape portions to be bent around the bending starting points.

5. The vehicle seat according to claim 1, wherein:
   the different surface shape portions have a bent shape overhanging to form a mountain shape in the application direction of the axial tension; and
   the insertion fastening structure is inserted into a vertex part of the mountain shape so that the mountain shape is pressed and bent flatly by the adjustment member.

6. The vehicle seat according to claim 5, wherein
   the opposed surface portion of the second member has escape holes formed in the vertex part of the mountain shape formed by the different surface shape portions, such that the escape holes relieve deformation of inclined portions to be moved in directions to be drawn to each other along with the mountain shape being pressed and bent flatly, so as to prevent expansion of the deformation.

7. The vehicle seat according to claim 1, wherein:
the insertion fastening structure is configured to fasten and fix a bolt to an internal thread; and
the internal thread is provided in a member integrally provided with the adjustment member.

8. The vehicle seat according to claim 1, wherein:
the second member is a hollow frame member having a closed sectional shape; and
the adjustment member is positioned inside the hollow frame member in a tensed manner by an elastic force.

9. The vehicle seat according to claim 1, wherein the first member is an anchor plate.

\* \* \* \* \*